Sept. 26, 1961 R. A. GRADT 3,001,569
TUBE FORMING TOOL
Filed April 29, 1958 5 Sheets-Sheet 1

INVENTOR.
Richard A. Gradt
BY
Olson & Trexler
Attys.

Sept. 26, 1961  R. A. GRADT  3,001,569
TUBE FORMING TOOL
Filed April 29, 1958  5 Sheets-Sheet 3

INVENTOR.
Richard A. Gradt
BY Olson & Trexler
attys.

Sept. 26, 1961  R. A. GRADT  3,001,569
TUBE FORMING TOOL
Filed April 29, 1958  5 Sheets-Sheet 4

Sept. 26, 1961 R. A. GRADT 3,001,569
TUBE FORMING TOOL
Filed April 29, 1958 5 Sheets-Sheet 5

INVENTOR.
Richard A. Gradt
BY
Olson & Trexler
attys.

United States Patent Office 3,001,569
Patented Sept. 26, 1961

3,001,569
TUBE FORMING TOOL
Richard A. Gradt, Elgin, Ill., assignor to Flexonics Corporation, Maywood, Ill., a corporation of Illinois
Filed Apr. 29, 1958, Ser. No. 731,826
11 Claims. (Cl. 153—32)

This invention relates to an improvement in a tool or die for continuously forming tubing from strips or sheets of metal.

Heretofore, tubing has been made by pushing or pulling longitudinal strips of sheet metal through a funnel type forming die, such as that shown in Fentress et al. Patent No. 2,145,867. The funnel type forming die shown by Fentress et al., is satisfactory for certain types of material, but other matreials, such as stainless steel, have a tendency to be grained or scratched in the forming process. It is frequently impossible to use a lubricant in the forming tool inasmuch as the sheet metal is carried from the die immediately to a welding station where opposed edges of the sheet metal are welded together, and the lubricant in most welding processes would prevent a good weld from being made at the edges.

Roller dies have certain disadvantages for forming tubing since only one portion of the roller die actually moves with the sheet metal, and the remainder of the roller die drags across the sheet metal which again causes graining. Also roller dies tend to wrinkle the sheet stock, particularly with light gauge material.

One of the objects of the herein disclosed invention is to provide a tube forming die which does not grain materials such as stainless steel, and which will not wrinkle thinwall stock.

Another object of the invention herein disclosed is to provide an improved die having a sectional lead-in.

A further object of this invention is to provide an improved sectional die wherein alternate stages are made of a relatively soft material and the remaining stages are made of a relatively hard material.

A further object of the invention disclosed herein is to provide a nonscratching forming die having a sectional lead-in including relatively soft long stages and relatively hard short stages alternately positioned in a longitudinal relationship.

Other objects and advantages of this invention will become apparent from the accompanying drawings and the description of the features of the specific embodiment of the invention herein disclosed.

In the drawings:

FIG. 15 is an end elevation of a tapered draw ring taken on line 15—15 in FIG. 10;

Figure 1:
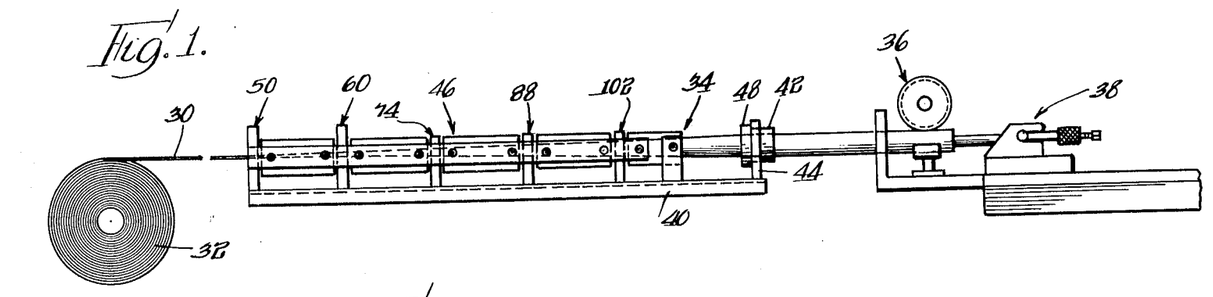
FIG. 1 is a side elevation of a tube forming apparatus including a die having a lead-in assembly embodying the herein disclosed invention.

The herein disclosed invention is generally used with a tube forming apparatus of the general type shown in FIG. 1. It may be seen that a substantially flat relatively thin metallic material 30 is rolled on a roll 32, from which it is pulled through a tube forming die generally indicated by numeral 34. The die 34 forms the stock sheet material into a cylindrical tubular shape, and opposed edges are then welded at a welding station, generally indicated by numeral 36, with either a butt or a lap weld to fix said edges to each other and complete the tube. The completed tube is then drawn to a drawing and storing station, generally indicated by numeral 38, which station 38 provides a suitable means for drawing the sheet material from the roll 32, through the die 34, and through the welding station 36. Reference is made herein to Andersen Patent No. 2,612,580 which discloses a welding station and drawing and storing means which may be used with the herein disclosed invention.

The tube forming die 34 includes a channel iron base 40, a tapered draw ring 42 mounted on said base 40 by a draw ring frame 44, and a lead-in assembly, generally indicated by numeral 46, mounted on said base 40 adjacent to the draw ring 42.

The draw ring 42 is made of a cast aluminum bronze having a good wear resistant property, and is formed with a tapered tube aperture extending therethrough having its smallest diameter substantially the same size as the desired outside diameter of the tube. The draw ring extends through a draw ring mounting aperture in frame 44, and a mounting collar 48 integral with the draw ring engages the frame and is fixed thereto by a plurality of screws not shown to secure the draw ring to the frame.

The lead-in assembly 46 includes a plurality of relatively thin stages hereinafter called "principal forming stages," a plurality of relatively long maplewood stages hereinafter called "auxiliary forming stages" and adjustment means for the auxiliary forming stages.

Figures 3, 4:
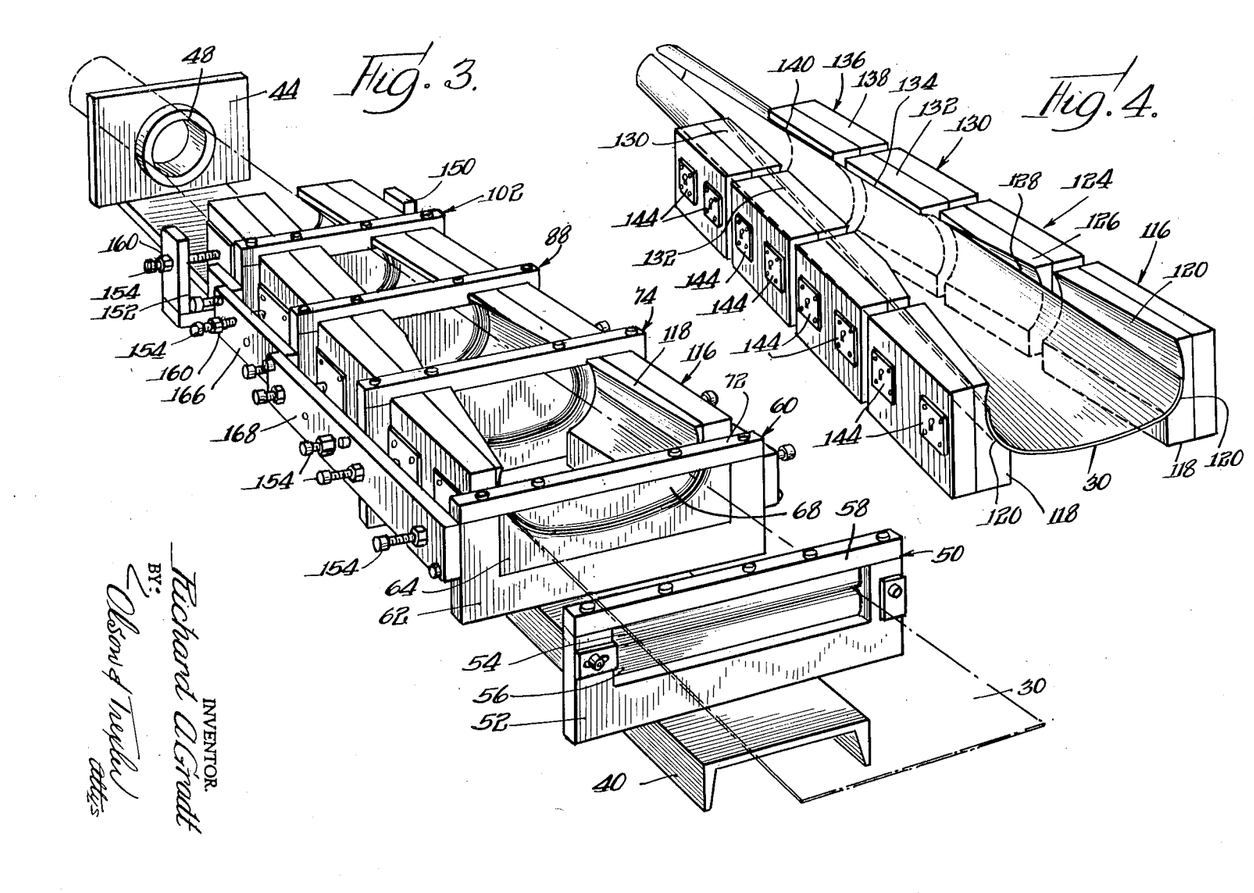
FIG. 3 is a perspective view of the die and lead-in assembly shown in FIG. 2 showing a piece of sheet material in phantom view formed therein.
FIG. 4 is a perspective view of a plurality of auxiliary forming stages and a piece of sheet material formed therein.
Figure 5:
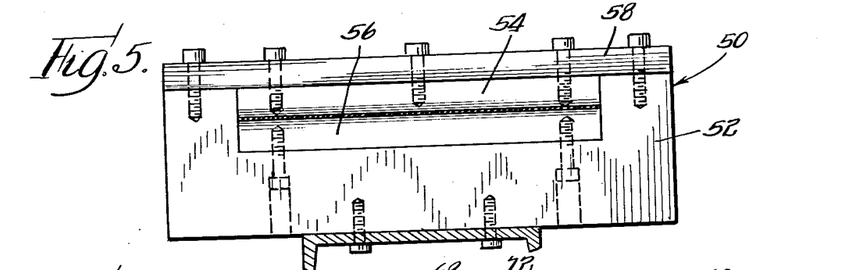
FIG. 5 is an end elevation of the first stage of the lead-in assembly taken on line 5—5 in FIG. 2.

A first principal forming stage, generally indicated by numeral 50 and best shown in FIGS. 3 and 5, is spaced from the draw ring 42 and aligned therewith. The first stage 50 includes a generally U-shaped carrier 52 which is fixed to the base 40. Upper and lower wear resistant aluminum bronze principal forming blanks 54 and 56, respectively, are mounted within the carrier 52, and the lower blank is held in the carrier 52 by means of a plurality of screws. A carrier bar 58 is attached by means of screws to the ends of the legs of the U-shaped carrier 52, and the upper blank is fixed thereto by a plurality of screws. Adjacent edges or forming surfaces of the blanks 54 and 56 are rounded and said adjacent edges are in substantially a straight line, for receiving a substantially flat piece of sheet material such as sheet stainless steel 30 therebetween. The edges are spaced from one another at a distance slightly greater than the thickness of the material to be received therebetween so that the material may be conveniently drawn therethrough without binding.

Figure 6:
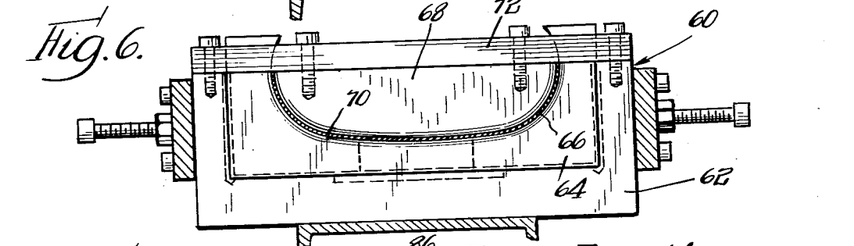
FIG. 6 is an end elevation of the second principal forming stage taken on line 6—6 in FIG. 2.
Figure 10:
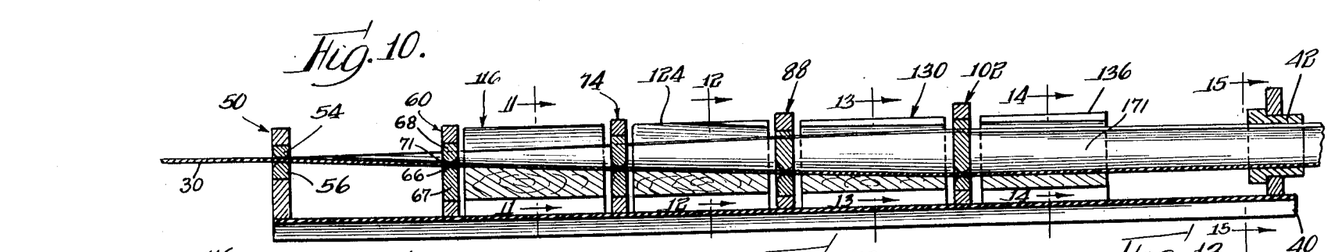
FIG. 10 is a cross-sectional view taken on line 10—10 in FIG. 2.

Looking now to FIGS. 3 and 6, a second principal forming stage 60 is shown therein. The second principal forming stage 60, which is similar to the first stage 50, includes a generally U-shaped carrier 62 made of a cast aluminum with a wear resistant aluminum bronze female principal forming blank 64 mounted therein and held therein by a plurality of screws. The female forming blank 64 has an interiorly curved rounded forming edge 66 defining a slight curve as may be clearly seen in FIG. 6. The sharply rounded convex shape of the forming edge 66, which engages the underside of the blank 30, is best shown in FIG. 10. A male principal forming blank 68, also made of a wear resistant aluminum bronze, has an exterior forming edge 70 complementary to the edge 66 and cooperating therewith to define a principal forming surface 71. As best shown in FIG. 10, the male forming surface 71 is also sharply rounded and convex toward the upper surface of the blank 30. The male forming blank 68 is fixed to a carrier bar 72 by means of a plurality of screws, and the carrier bar 72 is fixed to the carrier 62 by means of a plurality of screws. The edge surface 71 is spaced from the edge 66 a distance slightly greater than the thickness of the material to be pulled through the stage to allow the material to be formed between edges 66 and 70 without binding. Because of the convex curvature of the opposing edges 66 and 70, only a very narrow portion of the surface of each of these edges makes contact with the blank. The second principal stage 60 is fixed to the base 40 by a plurality of screws, and said stage 60 is positioned between the first principal forming stage and the draw ring as may be seen in FIGS. 1, 2, 3 and 10. It will be observed with reference to FIG. 10 that the opposing edges of each of the principal forming stages, including the first principal forming stage and succeeding principal forming stages to be described are sharply rounded and convex toward the blank 30.

Figure 7:
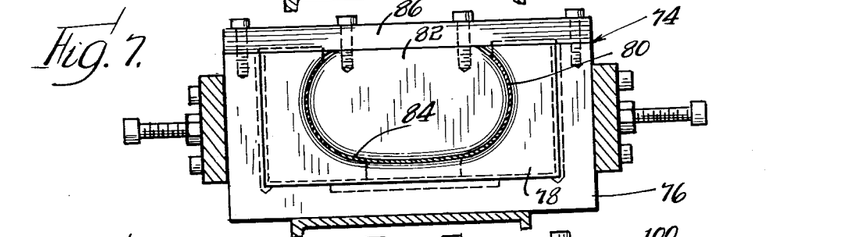
FIG. 7 is an end elevation of a third principal forming stage taken on line 7—7 in FIG. 2.

A third principal forming stage, generally indicated by numeral 74, is shown in FIGS. 3 and 7. The third principal forming stage includes an aluminum carrier 76, which is somewhat similar to the above described carriers 52 and 62 though more narrow but deeper, and a wear resistant aluminum bronze female principal forming blank 78 is fixed within the generally U-shaped carrier 76 in much the same manner that the female blank 64 is fixed in carrier 62. The female forming blank 78 has a rounded forming edge 80, which defines a curve which is substantially more rounded than the curve of forming edge 66 in blank 64 as may be seen by comparing FIG. 7 with FIG. 6. A wear resistant aluminum bronze male principal forming blank 82 has a rounded outer edge 84 complementary to the forming edge 80 and cooperating therewith to define a principal forming surface. Blank 82 is fixed by means of a plurality of screws to an aluminum carrier bar 86, which in turn is fixed to the carrier 76 by means of a plurality of screws. The male forming blank 82 is spaced a distance slightly greater than the thickness of the material to be formed between the blanks for the same reason that blanks 64 and 68 are spaced apart. The third principal forming stage 74 is fixed to the base 40 by a plurality of screws not shown, and is aligned with the draw ring and first and second principal stages between the draw ring and the second principal stage. The third stage is spaced from the second principal stage a distance equal to the distance between the first and second principal stages.

Figure 2:
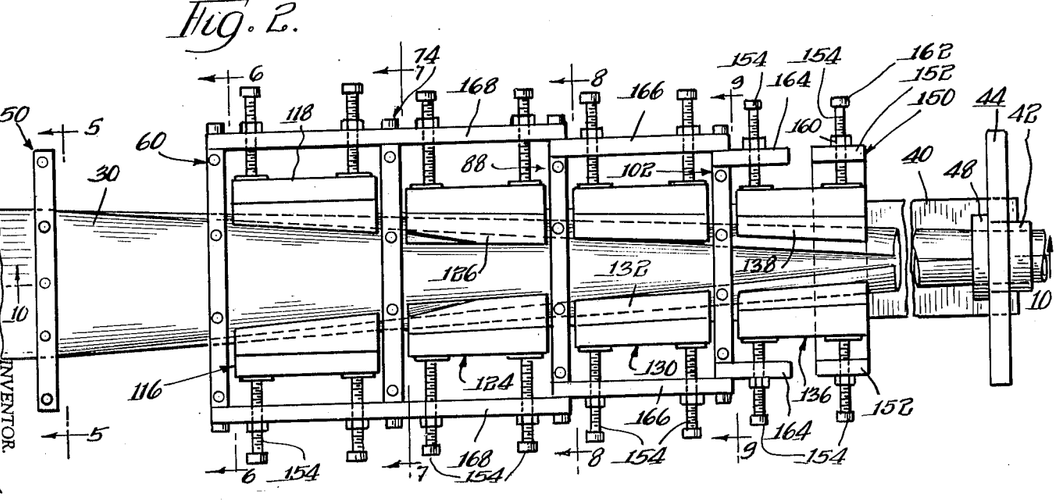
FIG. 2 is a plan view of the die shown in FIG. 1 including the lead-in assembly embodying the herein disclosed invention.
Figure 8:
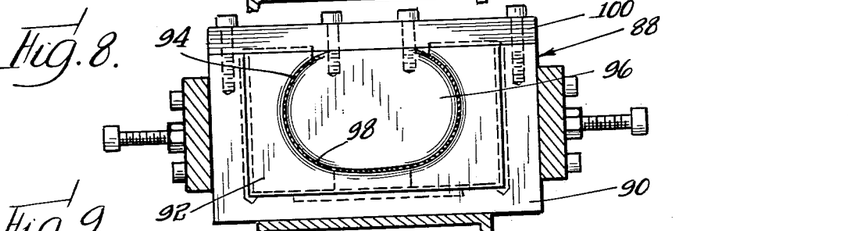
FIG. 8 is a fourth principal forming stage taken on line 8—8 in FIG. 2.

A fourth principal forming stage, generally indicated by numeral 88, is best seen in FIGS. 3 and 8. The principal forming stage 88 also has a generally U-shaped aluminum carrier 90, which is more narrow but deeper than any one of the above described carriers. A wear resistant aluminum bronze female principal forming blank 92 is fixed with the carrier 90 by a plurality of screws. The female forming blank 92 has an interior forming rounded edge 94 defining a curve which is more rounded than the preceding curve in the third stage 74 as may be seen in FIG. 7. A male principal forming blank 96 made of the same material as the female forming blank 94 also has a rounded forming edge 98, which is complementary to the forming edge 94 and cooperates therewith to define a principal forming surface. The male forming blank 96 is fixed to a carrier bar 100 by a plurality of screws, and the carrier bar 100 is also fixed to the carrier 90 by a plurality of screws. The carrier 90 is fixed to the base 40 by a plurality of screws between the draw ring and principal forming stage 74 as shown in FIGS. 2, 3 and 10 whereby adjacent stages are spread an equal distance apart.

Figure 9:
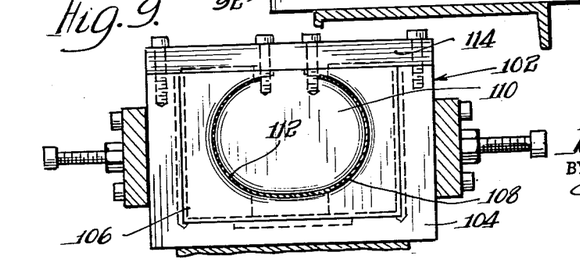
FIG. 9 is an end elevation of a fifth principal forming stage taken on line 9—9 in FIG. 2.

Looking now to FIGS. 3 and 9, the fifth and last principal forming stage is generally indicated by numeral 102. The fifth principal forming stage 102 is similar to the previously described principal forming stages. Principal forming stage 102 includes a generally U-shaped aluminum carrier 104, which is not as wide as the aforementioned carrier 90, but has a greater depth as may be seen by a comparison of FIGS. 8 and 9. A wear resistant aluminum bronze female principal forming blank 106 is fixed within the carrier 104 by means of a plurality of screws. The female forming blank 106, as in the case of the female forming blanks 64, 78 and 92, has a rounded forming edge 108, which edge defines a curve which is more rounded than any of the preceding curves. A male principal forming blank 110 is also made of a wear resistant aluminum bronze, and said blank 110 has a rounded forming edge 112, which is complementary to the forming edge 108 and cooperates therewith to define a principal forming surface. The male forming blank 110 is fixed to a carrier bar 114 by a plurality of screws, and the carrier bar 114 is fixed to the carrier 102 by a plurality of screws spacing the male forming blank from the female forming blank 106 by a distance slightly greater than the thickness of a material to be drawn through the fifth stage 102. The fifth and last stage 102 is fixed to the base 40 between the draw ring 42 and the fourth stage 88 at a distance equal to the distance between adjacent principal forming stages described above.

Figure 11:
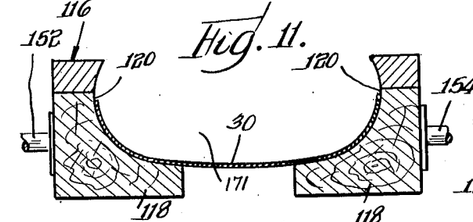
FIG. 11 is a cross-sectional view taken on line 11—11 in FIG. 10.

A first auxiliary forming stage, generally indicated by numeral 116, includes a pair of guide blocks 118, which are complementary so that their interior auxiliary forming surface 120 defines a desired tapered curve for material to be formed thereby, as may be seen in FIGS. 2, 3, 4 and 10. The first auxiliary forming stage 116 is positioned between the principal forming stages 60 and 74, and the end of auxiliary forming stage 116 proximate principal forming stage 60 has the forming surface 120 defining a curve similar to the curve of the principal forming blanks of stage 60, and the end of forming surface 120 proximate to principal forming stage 74 is similar to the curve defined by the forming blanks in the principal stage 74. Thus, the first auxiliary forming stage provides a smooth tapered forming surface between adjacent second and third principal forming stages; and a cross section of the first auxiliary forming stage midway the aforementioned principal forming stages is shown in FIG. 11.

Figure 12:
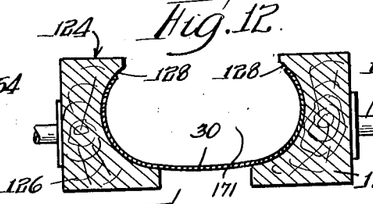
FIG. 12 is a cross-sectional view taken on line 12—12 in FIG. 10.

A second auxiliary forming stage 124, also shown in FIGS. 2, 3, 4 and 10, includes a pair of guide blocks 126 having an auxiliary forming surface 128 in the interior portions thereof. The second auxiliary forming stage is positioned on base 40 between the principal forming stages 74 and 88. The guide blocks 126 are constructed similar to the above described guide blocks 118 in that the portion of the forming surface 128 adjacent to principal forming stage 74 is similar to the curve of the forming edges, and at the other end adjacent to the principal forming stage 88, is similar to the curve defined by the principal forming blanks 92 and 96. Thus, the second auxiliary forming stage provides a smooth continuous forming surface between the adjacent third and fourth principal forming stages. The curve defined by the auxiliary forming stage midway the above indicated third and fourth principal forming stages is shown in FIG. 12.

Figure 13:
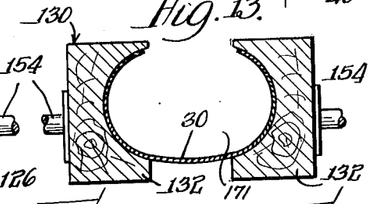
FIG. 13 is a cross-sectional view taken on line 13—13 in FIG. 10.

A third auxiliary forming stage 130 is positioned on base 40 between principal forming stages 88 and 102. The auxiliary forming stage 130 includes a pair of guide blocks 132 which are relatively long and define a tapered auxiliary forming surface 134 on each block. The forming surface 134 adjacent the third principal forming stage is similar to the curve defined by the forming edges of said principal forming stage 88. The end of the forming surface 134 adjacent to the stage 102 is similar to the curve defined by the forming edges of principal forming stage 102. The forming surface 134 defines a smooth tapered curve from one end to the other; and a cross section of the guide blocks 132 midway the principal forming stages 88 and 102 is shown in FIG. 13.

Figure 14:
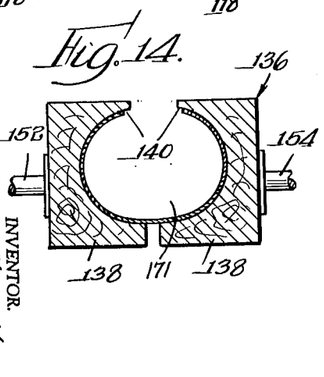
Figure 15:
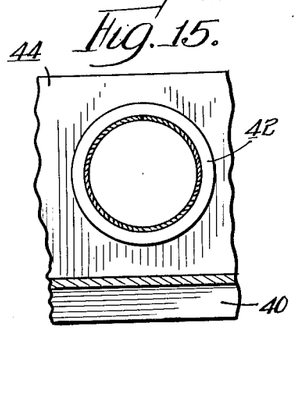
FIG. 15 is a cross-sectional view taken on line 14—14 in FIG. 10.

A fourth and final auxiliary forming stage 136 includes a pair of relatively long guide blocks 138, and said blocks 138 are positioned adjacent the principal forming stage 102 and spaced a distance from the draw ring 42 as may be seen in FIGS. 2, 3 and 10. An auxiliary forming surface 140 is defined by the guide blocks 138. The forming surface 140 at the end of the auxiliary stage 136 proximate the principal stage 102 is similar in cross section to the curve defined by the forming edges of the principal stage 102, and the curve tapers to a more rounded surface at the other end of the auxiliary forming stage 136. A cross section of the auxiliary forming stage 136 in the middle of the fourth forming stage is shown in FIG. 14, which shows the cross section of the forming surface as being almost circular.

In this particular instance, all of the guide blocks 118, 126, 132 and 138 are made of maplewood. However, it is possible to use other materials which are relatively soft and will not scratch a sheet material formed by the lead-in assembly.

Figures 16, 17:
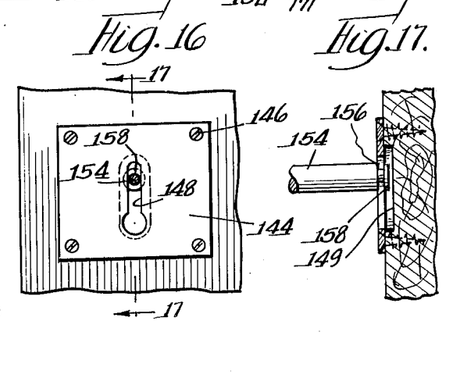
FIG. 16 is a side elevation of a portion of a guide block, a stud plate mounted thereon and an adjustment stud bolt in cross-section mounted in said plate.
FIG. 17 is a cross-sectional view taken on line 17—17 in FIG. 16.

An adjustment means cooperates with the base 40, and each of the auxiliary forming stages to laterally adjust the guide blocks thereby compensating for wear of said blocks. The adjustment means includes a plurality of stud plates 144 which are secured to the guide blocks by means of screws 146, as may be seen in FIG. 16. Each stud plate 144 has a keyhole slot 148 extending therethrough. Each of the guide blocks described above has a stud receiving slot 149 cut therein immediately below the keyhole slot 148 as may be seen in FIG. 17.

Referring now to FIGS. 2 and 3, a generally U-shaped adjustment bar 150 is fixed to base 40 by means of screws not shown. The adjustment bar 150 has a pair of vertical legs 152 which contain an adjustment bar aperture through which extends a threaded adjustment rod 154. Looking now at FIG. 17, it may be seen that a groove 156 proximate the end of rod 154 forms a retaining collar 158 at the end thereof. Referring back to FIG. 2, it may be seen that the adjustment rod 154 is threadably supported in the arm 152 and the retaining collar 158 is placed behind the stud plate 144 with the annular groove 156 slidably engaging the stud plate in the keyhole slot 148 to lock the rod to the stud plate. A locknut 160 locks the adjustment rod 154 in a lateral position on arm 152 as may be seen in FIGS. 2 and 3. At the outer end of the adjustment rod 154, a knob 162 is fixed thereto for convenient grasping and turning of the rod 154.

A pair of adjustment bars 164 are fixed to carrier 104 and extend longitudinally to the fourth auxiliary forming stage. A second pair of adjustment bars 166 extend from carrier 90 to carrier 104 and are positioned adjacent the adjustment bars 164, and a plurality of screws extending through bars 164 and 166 into carrier 104 fix the adjustment bars to carrier 104. A third pair of adjustment bars 168 extending from carrier 62 to carrier 90 overlap the adjustment bars 166 at carrier 90; and the adjustment bars 166 and 168 are fixed to the carrier 90 by means of a plurality of screws. Bars 168 are fixed at the other end to carrier 62 by a plurality of screws.

A threaded hole extends through each of the adjustment bars 164, a pair of spaced similar threaded holes extend through the bars 166, and four of such holes extend through adjustment bars 168. An adjustment rod 154 is threadably mounted in each of the holes and the end of each rod lockably engages a stud plate on an adjacent guide block so that rods extending through bars 164, 166 and 168 are in engagement with guide blocks 135, 132 and 126 and 118, respectively.

It may be seen that the cooperation of the adjustment rods 154 and the adjustment bars may adjust the position of the guide blocks in a lateral direction. The adjustment in a lateral direction is made by loosening the locknut 160 associated with the adjustment rod 154 which is to be the active adjusting rod. The rod is moved inward or outward depending upon the desired adjustment to the desired position of the guide block by rotating the rod within the threaded aperture. The locknut 160 is then tightened against the adjustment rod and the adjustment is completed. Thereby the adjustment bars and rods cooperate as an adjustment means for the guide blocks. It may be seen that the angle of the taper of the auxiliary forming surface may be adjusted by extending an adjustment rod cooperating with the forward portion of a guide block relative to a rear adjustment rod engaging the same block.

In operation, a piece of sheet material, especially sheet stainless steel, generally indicated by numeral 30, is delivered on a roll and threaded through the lead-in assembly through the draw ring and to the pulling means 38. As the pulling means applies a pulling force the sheet material is forced through the various stages in the lead-in assembly and through the draw ring, after which it is welded together and in this instance butt welding is used, but a lap weld may be used equally as well.

In the first principal stage, the sheet metal is substantially flat, it then flows to the second principal forming stage which is slightly rounded, and then it is drawn to the third principal forming stage which has even a more rounded curve therethrough. The first auxiliary forming stage serves to help form the sheet material and keep it in the formed stage. After leaving the third principal forming stage, the sheet material flows into the second auxiliary forming stage where it is further bent and retained therein, from whence it leads to the fourth principal forming stage where it receives a greater forming. Upon leaving the fourth principal forming stage, the material goes into the third auxiliary forming stage wherein guide blocks 132 guide the material and serve to form the sheet material further. From the third auxiliary stage, the material is pulled into the fifth principal forming stage where the material takes a more definite forming set; and upon leaving the fifth principal forming stage, it goes to the fourth auxiliary forming stage wherein guide blocks 138 further guide the material and serve to form the material even further. From the fourth auxiliary forming stage the material flows to the draw ring 42 where the material is formed in its final form.

It may be noted that the draw ring serves to help form the material coming thereto, thus, there is a cooperation between the guide blocks and the male forming blanks in the principal forming stages to form the material drawn to the tapered draw ring 42.

Looking at FIG. 4, it may be seen how the sheet material is formed in the lead-in assembly. The lead-in assembly defines an elongated substantially straight throat 171 shaped as shown in FIGS. 10 to 14 to effect a smooth continuous forming of the sheet material 30 from a flat to a substantially circular form as it is drawn longitudinally through the throat 171.

Since the sheet stainless steel is a very hard material, it tends t owear away the maplewood guide blocks. Wear of the guide blocks is compensated by the adjustment means which serve to laterally adjust the guide blocks as wear takes place in each guide block. Inasmuch as the guide blocks are made of wood they are relatively inexpensive to replace and they have the distinctive advantage of not graining the material which is formed therein.

Consider now a specific case of wear of one of the auxiliary forming stages. Should the maplewood guide blocks 132 of the auxiliary forming stage 130 wear away so that the auxiliary forming surface 134 is enlarged throughout and the enlargement is greatest proximate the principal forming stage 102, the auxiliary forming stage 130 is easily adjusted by loosening all of the locknuts in engagement with the adjustment rods supported by bars 166. The adjustment rods proximate the principal forming stage 88 are rotated so that the rods drive inward the end of the blocks 132 proximate the stage 88. The rods proximate the principal stage 102 are turned to drive inward the end of the blocks 132 proximate the stage 102 even further than the opposite end to compensate for the added wear proximate the fifth principal forming stage. The locknuts are tightened again and the adjustment is complete. It is obvious that the remaining auxiliary forming assemblies may be adjusted in a similar manner with the adjustment rods and bars associated therewith.

The principal forming stages which are made of a wear resistant aluminum bronze in this case, though any suitable wear resistant material may be used, are relatively inexpensive to manufacture, thus, any wear on the principal forming stages allows them to be replaced with a considerable economy. Furthermore, the rounded forming edges of the principal forming stages do not grain the sheet stainless steel as it passes through the principal forming stage.

Figures 18, 19, 20, 21:
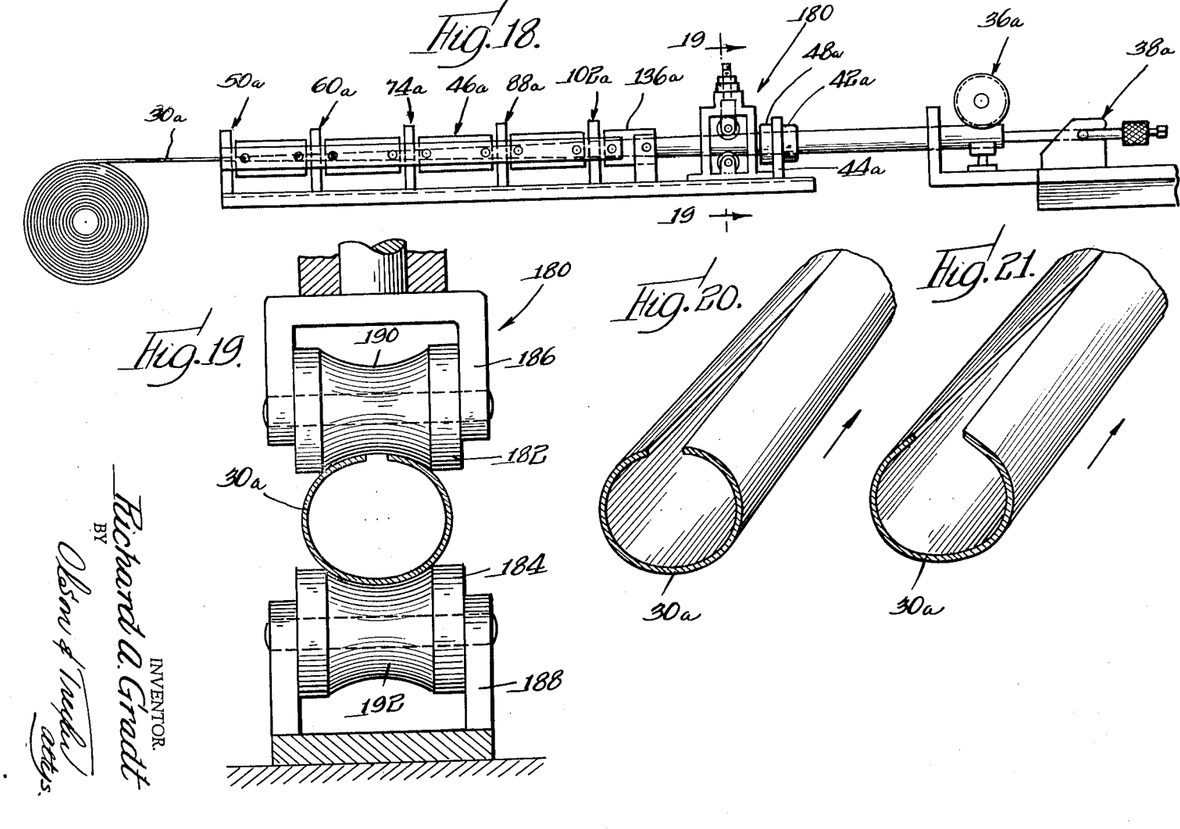
FIG. 18 is a side elevation of a tube forming apparatus incorporating a slightly modified embodiment of the present invention.
FIG. 19 is an enlarged fragmentary sectional view taken along line 19—19 in FIG. 18.
FIG. 20 is a fragmentary perspective view showing a portion of tubing formed in accordance with the present invention.
FIG. 21 is a view similar to FIG. 20 but shows the tubing in a shape which presents a problem solved by the present invention.

Referring now to FIGS. 18–21, a slightly modified embodiment of the present invention will be described, which embodiment is especially suitable for forming tubing from relatively heavy gauge material. It is obvious that as the thickness of the sheet material is increased, the loads imposed upon the forming members during a forming operation will increase. In addition, the edges of a partially formed strip tend to spring outwardly as the strip leaves the final forming stage and approaches the draw ring. More specifically, FIG. 20 shows a portion of a partially formed tube in the shape desired for approaching the draw ring in the direction of the arrow, and FIG. 21 shows how margins of the partially formed tubing may spring outwardly during the approach to the draw ring, especially when the tubing is being formed from relatively heavy gauge material. The embodiment of the apparatus shown in FIGS. 18 and 19 is especially suitable for preventing the margins of the tubing from springing outwardly to the position shown in FIG. 21 while the tubing is approaching the draw ring. In other words, this embodiment is especially suitable for maintaining partially formed tubing of heavier gauge materials substantially in the shape shown in FIGS. 19 and 20 during passage of the tubing to the draw ring. It has been found that if the tubing in the condition shown in FIG. 21 is permitted to pass to the draw ring, the relatively straight marginal portions of the tubing present edges which will engage and striate the draw ring. Furthermore, the tube will never be formed into a completely round condition so that the draw ring will be subjected to uneven wear.

The apparatus shown in FIGS. 18 and 19 is similar to the apparatus described above as indicated by the application of identical reference numerals with the suffix "a" added to corresponding elements. However, in order to overcome the above mentioned difficulties encountered with heavier gauge materials, the apparatus is provided with forming roller means 180 positioned between the final forming stage 136a and the draw ring 42a. The roller means 180 comprises upper and lower rollers 182 and 184 which are rotatably supported by suitable bracket means 186 and 188. The rollers are respectively provided with concave surfaces 190 and 192 for engaging and properly forming the tubing just prior to entry of the tubing into the draw ring. It is to be noted that these rollers should be used only in connection with the forming of relatively heavy gauge tubing since the margins of lighter gauge tubing will become rippled if an attempt is made to form them with the rollers. By way of example only, it is noted that a one inch outside diameter tubing formed from relatively light gauge material having a thickness from .005 inch through .012 inch should be processed without the use of the rollers while such a tube formed from a relatively heavy gauge material having a thickness from .016 inch through .030 inch should be processed with the use of the rollers.

While the preferred embodiments of the present invention have been shown and described herein, it is obvious that many structural details may be changed without departing from the spirit and scope of the appended claims.

The invention is claimed as follows:

1. A die assembly for forming a strip of flat sheet metal stock into a tube upon movement of the stock longitudinally through the assembly, comprising, die means defining a generally straight elongated tube forming throat having an inlet end shaped to receive flat sheet metal stock and having an outlet end shaped to discharge a generally cylindrical tube, said throat defining means comprising a series of principal forming stages and a series of auxiliary forming stages disposed in alternate relation to each other, said throat as defined by said principal and auxiliary forming stages having a curvature in transverse section which progressively increases from said inlet end to said outlet end to shape into a tube sheet metal stock moved longitudinally through the throat, each of said principal forming stages including relatively hard surface forming means defining relatively hard male and female forming surfaces spaced from each other to define a short longitudinal section of said throat, and each auxiliary forming stage including relatively soft surface forming means defining a progressively tapered longitudinal section of the throat much longer than said short throat sections.

2. A tube forming die for forming into a tube elongated sheet metal stock moved longitudinally through the die, comprising, in combination, die means forming a generally straight elongated throat having an inlet end adapted to receive flat sheet metal stock and having an outlet end adapted to discharge tubing in a substantially cylindrical form, said throat having a transverse shape which changes progressively from a generally flat form at said inlet end to a generally circular form at said outlet end, said throat having successive longitudinal portions thereof formed in stages comprising principal forming stages and auxiliary forming stages disposed in alternate relation to each other, each of said principal forming stages including means formed of relatively hard material and defining a female forming surface which is very narrow and shaped to define a short longitudinal section of said throat, each of said principal forming stages including means formed of a relatively hard surface opposing said female forming surface in spaced relation thereto to coact with the latter to force sheet metal stock therebetween to conform to the contour of the female surface, and each of said auxiliary forming stages including means formed of a relatively soft material defining a longitudinal throat section longer than said short sections and progressively constricted toward said throat outlet.

3. A tube die for forming elongated sheet metal stock moved longitudinally through the die into a tube, comprising, die means defining an elongated substantially straight throat having an inlet end adapted to receive a flat sheet metal blank and having generally circular outlet ends shaped to discharge a generally cylindrical tube, said die means being formed in successive longitudinal sections internally shaped to define successive longitudinal sections of said throat which have a transverse shaping changing progressively from a generally flat form at said throat inlet end to a generally circular form at said throat outlet end, said longitudinal throat sections including a series of principal forming stages and a series of auxiliary forming stages disposed in alternate relation to each other, each of said auxiliary forming sections comprising relatively soft material defining a longitudinal section of said throat having a transverse shape progressively increasing in curvature toward said throat outlet end, and each of said principal forming stages comprising relatively hard material defining a narrow forming surface defining a short longitudinal portion of said throat.

4. A die assembly for forming sheet metal stock into a tube upon movement of the stock longitudinally through the assembly, comprising, die means defining a generally straight elongated tube forming throat having an inlet end shaped to receive flat sheet metal stock and having an outlet end shaped to discharge a generally cylindrical tube therefrom, said throat defining means comprising a series of principal forming stages and a series of auxiliary forming stages disposed in alternate relation to each other and extending from said inlet end to said outlet end of said throat, said throat as defined by said principal and auxiliary forming stages having a transverse shape which changes progressively from a generally flat form at said inlet end to a generally circular form at said outlet end, each of said principal forming stages including relatively hard forming elements defining narrow edges spaced from each other and shaped to define a short longiutdinal section of the throat, the opposing surfaces of said opposing edges being sharply convex toward each other to have only a very narrow surface engagement wtih sheet metal stock therebetween, and each auxiliary forming stage including relatively soft surface forming means defining a progressively tapered longitudinal section of the throat much longer than said short throat sections.

5. A die for forming an elongated sheet metal blank moved longitudinally through the die into a tube, comprising, die means defining an elongated substantially straight throat having an inlet end adapted to receive a flat sheet metal blank and having a generally circular outlet end shaped to discharge a generally cylindrical tube, said die means being formed in successive longitudinal sections internally shaped to define successive longitudinal sections of said throat which have a transverse shaping changing progressively from a generally flat form at said throat inlet end to a generally circular form at said throat outlet end, said longitudinal throat sections including a series of principal forming stages and a series of auxiliary forming stages disposed in alternate relation to each other, each of said auxiliary forming sections comprising opposing sectons of wood adjustable toward and away from each other and defining a longitudinal section of said throat of substantial length which is progressively more constricted toward said throat outlet, and each of said principal forming stages comprising a material harder than said sections of wood and defining a narrow forming surface defining a short longitudinal portion of said throat.

6. A die for forming flat sheet metal stock moved longitudinal through the die into a tube comprising, an in-line series of spaced forming stages including principal forming stages and auxiliary forming stages disposed in alternate relation to each other, each of said forming stages defining a concave forming surface defining a longitudinal segment of a throat formed by all said forming stages and extending longitudinally through said series of stages from an inlet end shaped to receive flat sheet metal stock to a circular outlet end shaped to discharge a generally cylindrical tube, the transverse shape of said throat as defined by the successive forming stations from said throat inlet end to said throat outlet end being progressively more constricted to change from a generally flat form to a generally circular form, each of said principal forming stages defining a narrow hard forming surface defining a very short longitudinal section on said throat and each of said auxiliary forming stages defining a relatively soft concave surface forming a longitudinal section of said throat longer than said short sections and tapered to become progressively more constricted toward said throat outlet.

7. For forming sheet metal stock to have a predetermined shape in transverse section, die means defining an elongated generally straight throat through which the sheet metal stock is moved longitudinally to be formed into the desired shape, the throat being shaped at an inlet end thereof to receive flat sheet metal stock and being shaped at an outlet end thereof to conform to a predetermined shape, said die means comprising, in combination, an in-line series of forming stages defining curved forming surfaces forming successive longitudinal sections of said throat, the longitudinal sections of said throat formed by the successive forming stages from the throat inlet end to the throat outlet end being successively more constricted to approach the final shape of the throat outlet, said forming stages including principal forming stages and auxiliary forming stages disposed in alternate relation to each other, said principal forming stages including means formed of a relatively hard material defining relatively short longitudinal sections of the throat, and said auxiliary forming stages including means formed of a relatively soft material defining relatively long longitudinal sections of the throat.

8. Tube forming means for forming flat sheet metal stock into a tube, comprising, in combination, an in-line series of forming stages including principal forming stages and auxiliary forming stages disposed in alternate relation to each other, each of said forming stages defining a concave forming surface forming a longitudinal segment of a throat formed by all said stages and extending longitudinally through said series of stages from a generally flat inlet end shaped to receive flat sheet metal stock to a circular outlet end shaped to discharge a generally cylindrical tube, the transverse shape of said throat as defined by the successive forming stations from said throat inlet end to said throat outlet end being progressively more constricted to change from a generally flat form to a generally circular form, each of said principal forming stages defining a narrow forming surface defining a very short longitudinal section on said throat, each of said auxiliary forming stages defining a concave surface forming a longitudinal section of said throat longer than said short sections, a draw ring mounted in aligned spaced relation to said throat outlet end, means for moving sheet metal stock through said throat and draw ring, a pair of rollers positioned to engage opposite sides of a tube passing from said throat outlet end to said draw ring, and said rollers being oriented with the axes thereof parallel to said generally flat throat inlet end.

9. For forming sheet metal stock to have a predetermined shape in transverse section, die means defining an elongated generally straight throat through which the sheet metal stock is moved longitudinally for forming into the desired shape, the throat being shaped at an inlet end thereof to receive flat sheet metal stock and being shaped at the outlet end thereof to conform to a predetermined shape, said die comprising, in combination, an in-line series of forming stages defining curved forming surfaces forming successive longitudinal sections of the forming throat, the longitudinal sections of said throat formed by the successive forming stages from the throat inlet to the throat outlet being successively more constricted to approach the final shape of the throat outlet, said forming stages including principal forming stages and auxiliary forming stages disposed in alternate spaced relation to each other, said principal forming stages including a relatively hard material forming convex edges which define short longitudinal sections of the throat, and said auxiliary forming stages including a relatively soft surface forming material spaced longitudinally from the convex edges of adjacent principal forming stages and defining relatively long longitudinal sections of the throat.

10. Tube forming apparatus comprising, in combination, die means defining a generally straight elongated tube forming throat shaped at an inlet end thereof to receive flat sheet metal stock and shaped at an outlet end thereof to discharge cylindrical tube, a circular draw ring aligned with said throat and spaced from said outlet end thereof, pulling means for pulling sheet metal stock through said throat and said draw ring to form a tube, said throat being formed by an in-line series of forming stages including principal forming stages and auxiliary forming stages disposed in alternate relation to each other, said principal forming stages each defining a hard forming surface forming a short longitudinal segment of said throat, each of said auxiliary forming stages including means defining relatively soft forming surfaces shaped and dimensioned to form a relatively long longitudinal section of said throat, said throat having a transverse shaping as defined by the successive forming stations changing from a generally flat shape at said throat inlet to a generally circular shape at said throat outlet, and a pair of spaced rollers located between said throat outlet and said draw ring to engage opposite sides of a tube moving from said throat into said draw ring, and said rollers being oriented so that one of said rollers spans the adjacent longitudinal edges of the sheet metal stock formed into a tube within the throat.

11. In a die for forming sheet metal moved longitudinally through the die, the combination of a base, a plurality of relatively short principal forming stages coaxially mounted on said base, each of said principal forming stages defining a relatively hard forming surface, the forming surfaces of said successive stages progressively approaching a final desired form, a plurality of auxiliary forming stages disposed between said principal forming stages in alternate relation to the latter, said auxiliary forming stages being relatively long in relation to the adjacent principal forming stages, each of said auxiliary forming stages comprising a pair of guide blocks defining a tapering forming surface which conforms at opposite ends to the adjacent principal forming surfaces, said guide blocks of each auxiliary forming stage and the forming surfaces defined thereby being softer than the adjacent principal forming stages and the forming surfaces defined by the latter, and lateral adjustment means cooperating with said auxiliary forming stages to adjust the guide blocks in each of said auxiliary forming stages to compensate for wear on the guide blocks.

References Cited in the file of this patent

UNITED STATES PATENTS

| | | |
|---|---|---|
| 1,652,396 | Dallas | Dec. 13, 1927 |
| 1,746,281 | Riemenschneider | Feb. 11, 1930 |
| 2,357,605 | Nivison | Sept. 5, 1944 |
| 2,745,121 | Green | May 15, 1956 |

FOREIGN PATENTS

| | | |
|---|---|---|
| 28,443 | Great Britain | Dec. 27, 1907 |